United States Patent [19]

Richmond et al.

[11] Patent Number: 4,604,501

[45] Date of Patent: Aug. 5, 1986

[54] VOICE COMMUNICATION SYSTEM

[75] Inventors: Moscow K. Richmond, 2819 Butler Ave., Los Angeles, Calif. 90066; Thomas R. Richmond, Santa Ana; Patrick S. Kochie, Simi Valley, both of Calif.

[73] Assignee: Moscow K. Richmond, Los Angeles, Calif.

[21] Appl. No.: 658,765

[22] Filed: Oct. 9, 1984

[51] Int. Cl.⁴ .............................................. H04M 1/60
[52] U.S. Cl. .................................. 179/81 B; 179/2 A
[58] Field of Search ............ 381/94; 179/81 B, 100 L, 179/18 BC, 2 A, 81 R; 455/79

[56] References Cited

U.S. PATENT DOCUMENTS 3,588,360 6/1971 Knox .................................. 179/81 B
4,467,143 8/1984 Warman ......................... 179/18 BC
4,513,177 4/1985 Nashino et al. ............. 179/100 L X Primary Examiner—James L. Dwyer
Attorney, Agent, or Firm—Robert J. Schaap

[57] ABSTRACT

A voice communication system of the so-called "hands-off" type in which a telephone or other speaker-microphone combination in relatively noise free environment, usually an interior environment, can be in voice communication with a so-called "hands-off" speaker-microphone combination located in a relatively noisy environment, usually an exterior environment and where substantial and variable background noise may exist. A microprocessor is used to effectively monitor a telephone link between the two microphone-speaker combinations and will provide microphone control to that microphone located in the relatively noise free environment. Thus, if voice signals are detected on the telephone link, and if those voice signals eminate from the relatively noise free or relatively quiet environment, voice communication control will remain with the party in that environment. If the party in the relatively noise free or quiet environment ceases talking, then the party in the relatively noisy environment may exercise speaking control over the telephone link, but only so long as the party in the relatively noise free environment does not generate any sound over the voice communication link. The processor will constantly monitor to determine whether or not the party in the relatively noise free environment is attempting to exercise control over the link by speaking and will effectively provide that control to the party in that relatively noise free environment.

27 Claims, 3 Drawing Figures

VOICE COMMUNICATION SYSTEM

BACKGROUND OF THE INVENTION

1. Field of the Invention

This invention relates in general to certain new and useful improvements in a modified form of half duplex voice communication system having a pair of speaker-microphone combinations and which control over the generation of sounds in a link between the two microphone-speaker combinations is dedicated to a party using one such combination and not the other.

2. Brief Description of the Prior Art

Private telephone links between a secured area or an enclosed environment and an unsecured area or external environment, or so-called "exterior environment", have been widely used in recent years for purposes of security and the like. For example, in controlled access apartment buildings or homes, someone wishing to gain access to the grounds of that apartment building or home must first call an occupant of the apartment building or home through a telephone link. A telephone handset may be located in the external environment or outside of the building and a telephone handset in the apartment or home can be switched into communication over a telephone line, which may be a private intercom line A conventional dialer and buzzer arrangement is typically employed in these systems.

In recent years, due to the tendancy of handset theft and other forms of vandalism, many security buildings and limited access buildings and other security and limited access environments have attempted to replace the handset, at least in the external environment with a combination speaker- microphone arrangement. This speaker-microphone arrangement is typically mounted behind a shield or screen within a wall in order to reduce a potential for theft or vandalism.

There are many attendant problems to the use of the speakermicrophone arrangement. These systems are typically operated on the full duplex principle, that is, the microphone receiving the noise, which may be spoken communication, will exercise control over the line. Thus, for example, if the party in the relatively quiet environment, such as the apartment or home, is generating sounds over the voice communication link, that party will maintain control over the voice communication link until such time that he or she stops talking. In like manner, if the party in the relatively noisy environment, who may wish to gain access to the building or controlled area, for example, is speaking over the voice communication link then that party will generally maintain control over the link until such time as he or she has completed talking. The telephone handset or other speakermicrophone combination in the external or exterior environment is generally in a relatively noisy environment. The noise background in the external environment is variable and can range from being slightly relatively quiet to excessively noisy in a relatively short time period. The telephone handset or other speaker-microphone in generally a relatively noise free environment.

A significant problem arises in conventional voice communication systems if there is any substantial background noise. When the user is not speaking into a handset and substantial noise is in the background, there is effectively no discrimination between the users voice and the background noise. Consequently, background noise can interfere to a point where the outside or external telephone will maintain complete control over the line to the exclusion of the party at the other end on the inside of the apartment or in some other relatively noise free environment. Thus, these systems have been relatively ineffective in certain areas.

In telephone communication links, the speaker in the handset is sufficiently distant from the microphone so as to eliminate any significant feedback problems. Even with the so-called "telephone speaker system" or so-called "squawk box", when the speaker is located a sufficient distance from the microphone, there is still little or no feedback problem. However, in the conventional hands-off telephone access line, which utilizes a speaker-microphone combination, generally mounted in very close relationship, the feedback problems become quite acute.

Recently, the half-duplex system has been used to obviate the aforesaid problem on the theory that both parties do not talk at the same point in time. In the half-duplex system, the circuit is designed to monitor the line and determine the source of a sound signal which may be a voice signal. Thus, if the party in the interior or relatively noise free environment is speaking, that party will have transmit control over the line until he or she stops talking, In like manner, once the party in the external or relatively noisy environment starts talking, that party will transmit until he or she stops talking. Again, the problem arises where there is a source of background noise in the external environment. This source of noise in the background could constantly keep the external phone in the transmit mode thereby precluding the party in the interior environment from speaking at all.

The present invention obviates these and other problems in the provision of a voice communication system in which a microprocessor circuit monitors the telephone line to determine the existence of signals on that telephone line. The microprocessor is designed to provide transmit control to the party in the generally interior or relatively noise free environment and thereby only permits transmit control to the party in the external or relatively noisy environment when the party in the interior environment is not transmitting voice signals.

OBJECTS OF THE INVENTION

It is, therefore, a primary object of the present invention to provide a voice communication system in which one microphonespeaker combination is located in an interior environment and in which a voice microphone speaker combination is located in an external environment and in which transmit control is dedicated to one of the microphone speaker combinations.

It is another object of the present invention to provide a voice communication system of the type stated in which transmit control is dedicated to the microphone-speaker combination in an enclosed environment such that the user in the interior environment can maintain voice control over the telephone link.

It is a further object of the present invention to provide a voice communication system of the type stated in which a handsoff speaker microphone arrangement is used in the exterior environment and in which telephone monitoring by a microprocessor is conducted to provide microphone-speaker control to a party in an interior environment to thereby obviate the problem of ambient noise in the exterior environment.

It is also an object of the present invention to provide a voice communication system of the type stated which effectively contains an electronically operable voice actuated push-to-talk switch.

It is still another salient object of the present invention to provide a method of monitoring a voice communication link and dedicating voice control in that link to one of a pair of microphone speaker combinations.

With the above and other objects in view, our invention resides in the novel features of form, construction, arrangement and combination of parts presently described and pointed out in the claims.

BRIEF SUMMARY OF THE DISCLOSURE

The present invention utilizes a control circuit for monitoring a telephone communication link between two pairs of microphone-speaker combinations and one of which is located in an exterior or other relatively noisy environment and the other of which is located in an interior or relatively noise free environment.

As used herein the term "relatively noise free" environment means an environment in which there is not sufficient ambient background noise to exercise microphone control over a speakermicrophone combination at one end of a voice communication link, and which may be, although not necessarily, in an interior environment. The term "relatively noisy" environment means an environment in which there may be ambient background noise, whether or not constant or intermittent, and which could interfere with a microphone-speaker combination at the other end of the voice communication link. The term "relatively noisy" is usually, although not necessarily an exterior environment.

The control circuit of the present invention dedicates transmit control to a microphone in an interior or relatively noise free environment. The control circuit enables the microphone so that the person in the exterior environment can transmit when the person in the interior environment is not transmitting. The control circuit effectively monitors the telephone link to determine if a voice signal is in the link. If there is a signal in the link, it will reset and effectively monitor a short time later. If there is no signal in the link, it will permit the party in the exterior environment to transmit at least until such time that the party in the interior environment attempts to transmit. At any point in time where there is an attempt by the party in the interior environment to transmit, that party will immediately assume transmit control over the line and the party in the exterior environment will only be in a receive mode. The party in the exterior environment can only transmit when the party in the interior environment is no longer transmitting. In this way, the problem of excess background noise can be obviated since the party in the interior environment can always immediately assume transmit control.

This arrangement is accomplished by use of the microprocessor circuit which effectively monitors the telephone link. At any point in time where the microprocessor circuit detects the party in the interior environment attempting to generate voice sounds, it will immediately close the transmit circuit from the exterior microphone and permit the party in the interior environment to transmit.

When turning on the system and monitoring the voice communication link, if there is a voice signal on the line it is presumed to be coming from the interior environment because the external microphone will effectively be off during periods of monitoring. After a predetermined period, another monitor of the line is made. If there is still noise on the line, it is presumed that the person in the interior environment is talking and thus, the speaker in the exterior environment will be activated so that the party in the exterior is in the receive mode, but not the transmit mode. During each monitor of the phone line, the external microphone is temporarily disabled so that any signal on the line cannot be the result of external noise or someone talking on the external microphone. If there is no noise on the line, it is understood that no one on the interior is talking and therefore, the microphone in the exterior environment will be enabled. This will permit the party in the exterior environment to transmit.

The voice communication system comprises a microprocessor circuit, as aforesaid, and which operates in combination with a timing circuit to enable a monitor of the link at periodic time intervals. If there is a sound on the line, it is presumed to be generated at the microphone in the interior environment, as aforesaid, and the microprocessor will dedicate transmit control to the microphone at the interior environment. The timer will thereupon reset and make another monitor at the end of the preestablished monitor time interval.

The microprocessor control circuit also comprises a speaker enable circuit which enables the speaker at the external environment when transmit control is dedicated to the microphone at the interior environment. Further, a switch is associated with the microphone at the exterior environment. This switch will be "off" when transmit control is dedicated to the microphone in the interior environment.

When a monitor of the phone link is made and no voice is detected, the switch associated with the microphone at the exterior environment will be turned "on", further permitting the microphone at the exterior environment to transmit an audible message. This switch will remain on until such time that the party in the interior environment desires to transmit, at which point the switch associated with the microphone in the exterior environment will be automatically turned "off".

The control circuit includes other functions such as a touch-tone dialing converter circuit, a phone number programmer for programming the phone number of the interior telephone system, and the like. In addition, a tone splitter is employed to enable easy and quick processing of an introduced telephone number.

This invention possesses many other advantages and has other purposes which may be made more clearly apparent from a consideration of the forms in which it may be embodied. These forms are shown in the drawings forming part of and accompanying the present specification. They will now be described in detail for purposes of illustrating the general principles of the invention, but it is to be understood that such detailed descriptions are not to be taken in a limiting sense.

BRIEF DESCRIPTION OF THE DRAWINGS

Figure 1:
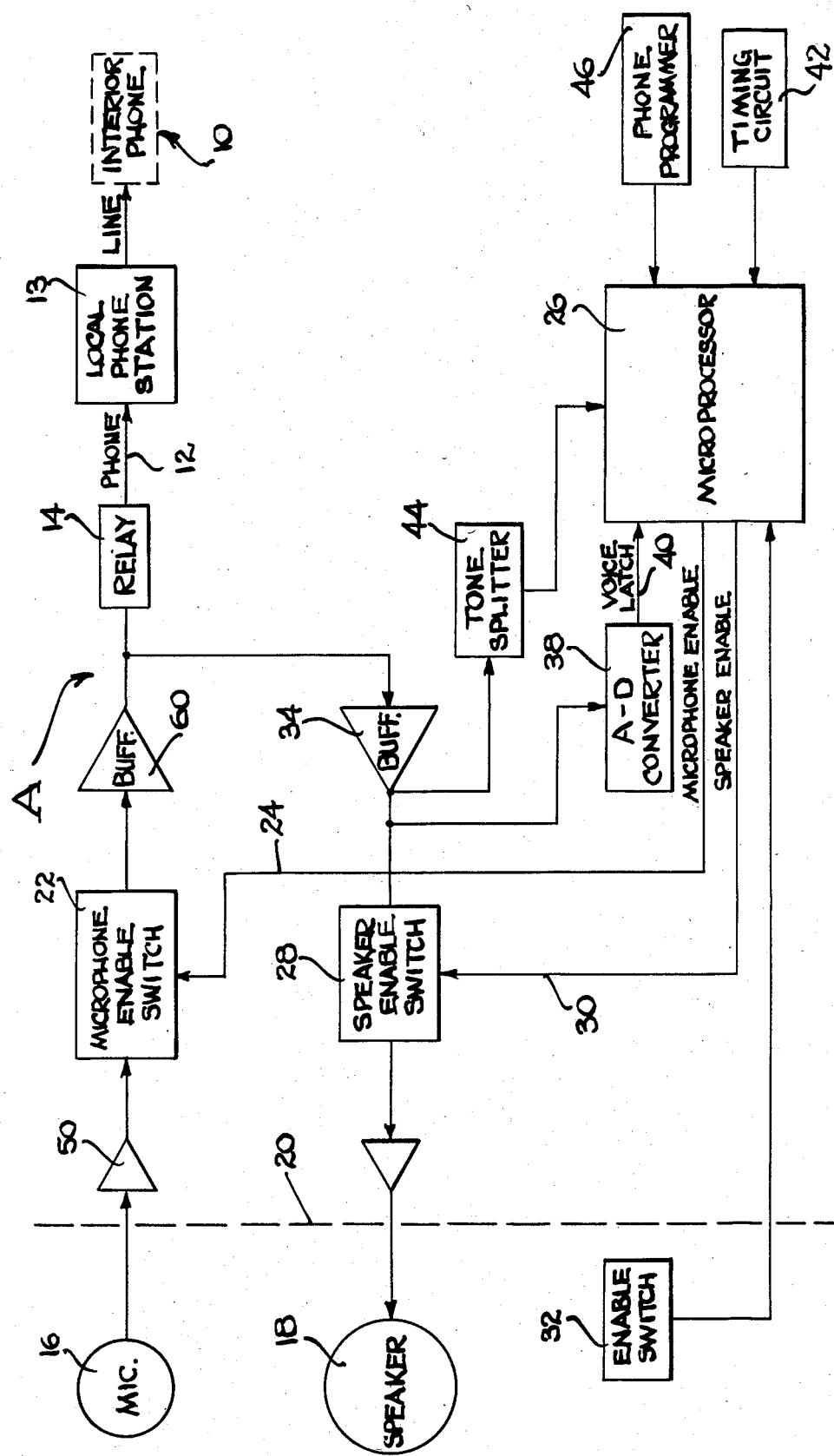
Figure 2:
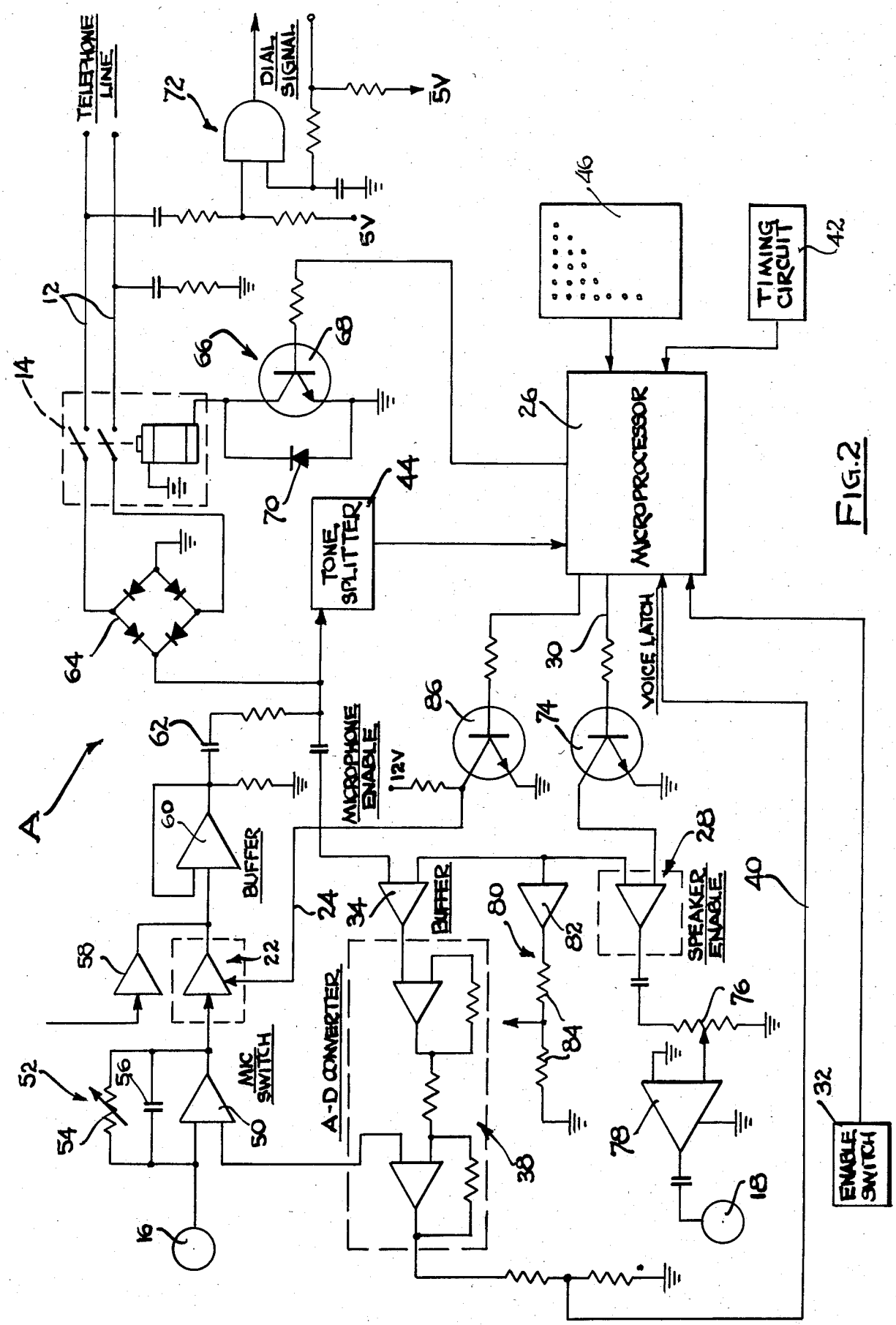
Figure 3:
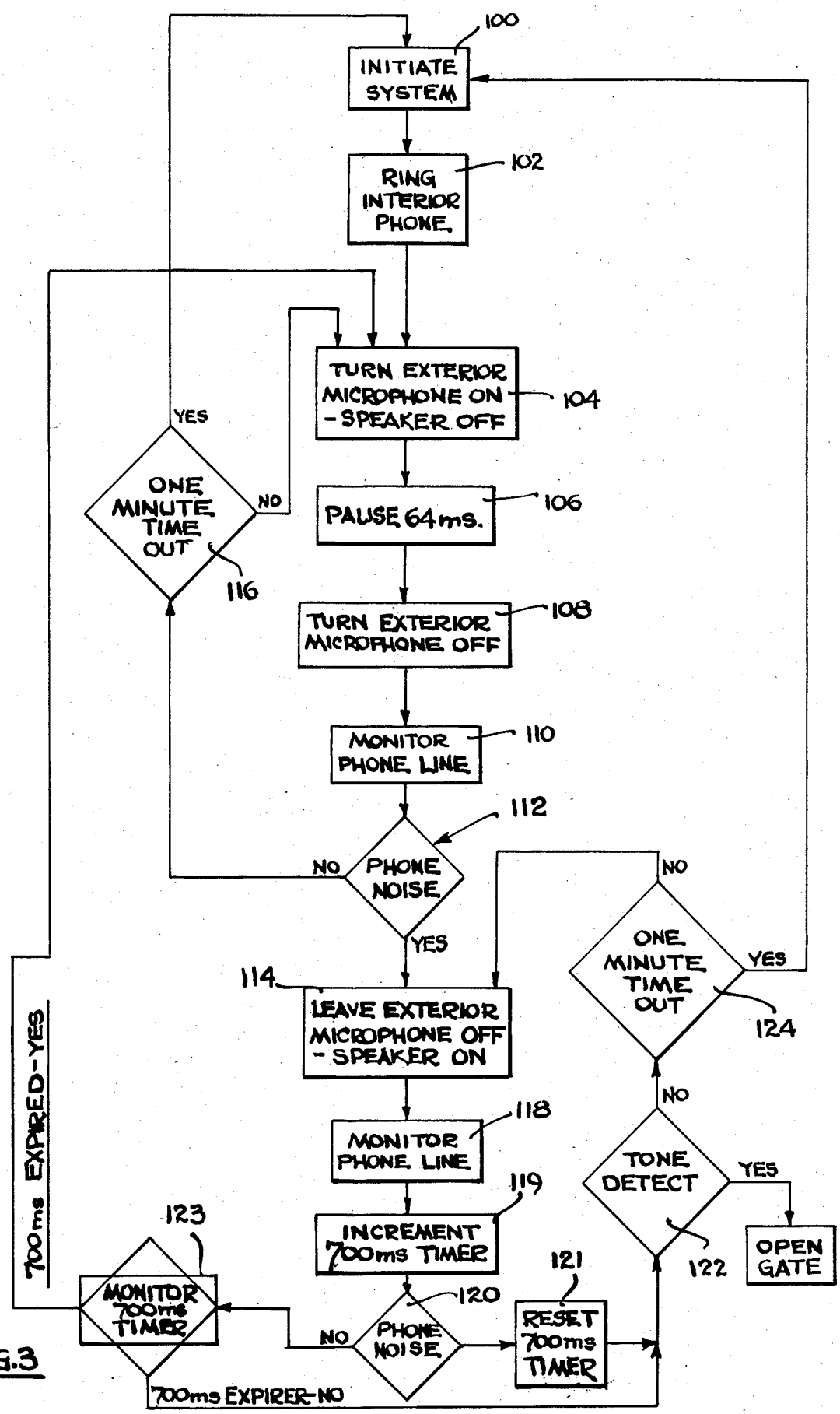

Having thus described the invention in general terms, reference will now be made to the accompanying drawings in which:

FIG. 1 is a schematic block diagram view of a voice communication system constructed in accordance with and embodying the present invention; and FIG. 2 is a more detailed circuit view of a voice communication system of the present invention; and FIG. 3 is a schematic flow diagram showing method steps forming part of the present invention.

DETAILED DESCRIPTION OF A PREFERRED EMBODIMENT

Referring now in more detail and by reference characters to the drawings, A designates a voice communication system in accordance with the present invention and which comprises an interior phone assembly 10 of a conventional type which includes a microphone and speaker, as for example, mounted in a conventional telephone handset. This interior phone assembly 10 is connected over a conventional phone line 12, as for example, to a central station or so-called "local phone" station 13, in the manner as illustrated. A relay 14 may be located in the phone line 12 on the opposite side of the station 13 with respect to the interior phone assembly 10, in the manner as illustrated in FIG. 1.

The interior phone assembly 10 is used in combination with a so-called "hands off" telephone set comprised of a microphone 16 and a speaker 18. This type of set is referred to as a "hands off" set since the speaker 18 and microphone 16 are fixedly mounted in a wall or other supporting structure. A dashed-line 20 in FIG. 1 illustrates items to the left of that line as being located in an exterior environment. The microphone 16 and speaker 18 are thus effectively connected to the interior phone when the number of that interior phone assembly is introduced, e.g. dialed, over the phone line 12.

The system of the present invention utilizes a microphone enable switch 22 to turnoff and turn on the microphone 16 in accordance with a microphone enable signal transmitted over a microphone enable signal line 24 from a microprocessor 26. The exterior speaker 18 is also enabled by means of a speaker enable switch 28 when a speaker enable signal is received from the microprocessor 26 over a speaker enable signal line 30.

An enable switch 32 is also located in the interior environment for manual actuation by a user in the outside or exterior environment. This enable signal is connected to the microprocessor 26 for enabling the latter to dial or generate a ringing signal on the interior phone assembly 10.

When a party on the interior phone 10 is speaking, a voice representing signal is generated through the phone line 12 and to a buffer amplifier 34. The signal from the buffer amplifier 34 is transmitted to the microprocessor 26 through an analog-digital converter 38. The output of the analog-digital converter 38 is a voice latch signal which is responsive to a party transmitting at the interior phone assembly 10 and which is introduced to the microprocessor 26 over a voice latch signal line 40. In addition, any signal on the interior phone 10 is introduced into a tone splitter 44 which is also connected directly to the microprocessor 26, for reasons which will presently more fully appear.

In accordance with this construction, when someone on the interior phone 10 is speaking, a signal is generated through the telephone line 12, through the buffer 34 and the analog-digital converter 38 to create a voice latch signal to the microprocessor 26. This will, in turn, generate a speaker enable signal which will enable the exterior speaker 18 through the speaker enable switch 28. However, the microprocessor will not generate a microphone enable signal, thereby precluding transmit control to the exterior microphone 16.

If the party on the interior phone also generates a tone signal, as for example, by pressing one of the touch tone buttons on the phone to create a certain command signal, as for example, to open a gate, the tone splitter 44 will receive that signal and transmit the same to the microprocessor 26. Thereupon, the microprocessor will recognize this signal as a certain command signal and generate a signal to take a positive action, as for example, open or close a gate or a door or the like. Thus, the party at the interior phone assembly, by pressing the proper key switches of a touch tone telephone set in proper predetermined combinations, can generate a particular code to cause the microprocessor to permit some external function to take place.

The microprocessor 26, under the control of a timing circuit 42, which may actually be part of the microprocessor 26, will periodically monitor the phone line 12 to determine if there is a voice signal on this line. If a voice signal is detected, it will be presumed to be coming from the interior phone 10. If there is no voice signal on the line at the time of a monitor, then it is presumed that no one on the interior phone is talking.

While microphone control is always dedicated to the interior phone 10, the exterior microphone 16 can actually remain on until such time that it is turned off and the exterior microphone will be turned off each time that the party on the interior phone attempts to transmit a message. If there is a voice on the phone line, it will be presumed to be coming from the interior due to the fact that the exterior microphone is initially off. This situation will remain until the next monitor.

In operation, when the system is initiated, the user at the exterior phone will attempt to ring the interior phone. When the handset of the interior phone is removed from the cradle, or otherwise when an interior microphone is turned on, the exterior microphone will initially be turned on and the exterior speaker will be turned off. A sixty four millisecond time delay period, under the control of the timing circuit 42, is then started. At the end of sixty four milliseconds, the exterior microphone is disenabled. A two millisecond phone line settling period is allowed and thereafter, the phone line is monitored for two additional milliseconds, which constitutes a monitor period, in order to determine if noise is present. Inasmuch as the exterior microphone is off during the monitoring, if no noise is detected during the two millisecond monitor, it is presumed that no one on the interior microphone is talking. Therefore, the exterior microphone 16 will be re-enabled and the exterior speaker 18 will remain off. At this point, the sixty four millisecond time period is started over. In this way, it is possible to permit the user at the exterior microphone 16 to continue to talk until such time as someone on the interior microphone desires to exercise transmit control.

If, during a monitor period, noise is detected on the phone link, it must be presumed to be coming from the interior microphone since the exterior microphone will have been disenabled during the monitor period. In this case, the exterior microphone 16 will be de-energized and the exterior speaker 18 is turned on.

When the exterior speaker is on, that is when microphone control is dedicated to the interior phone, a three hundred millisecond time period is started. The microprocessor 26 will continuously monitor the phone line for any noise. If any noise is detected on the phone line, the three hundred millisecond time period resets and is started over. During the time that the sixty four millisecond timer is off no external microphone switching can occur. If the three hundred millisecond time period is complete, that is, there is no noise on the phone line for three hundred millisecond, the exterior speaker 18 is then turned off and the exterior microphone 16 is then turned on. At this point, the sixty four millisecond time period is started over and the whole process will repeat again.

In effect, the system can be considered to operate in such manner that the exterior microphone always remain on until such time as someone on the interior environment attempts to transmit. At this point, the system will immediately shift to the three hundred millisecond transmit period. During a monitor in the three hundred millisecond period, if there is no phone noise, the microprocessor will determine if the three hundred milliseconds has fully expired. If there has been no expiration of the three hundred millisecond period, then the external microphone will remain off and the speaker will remain on so that the party on the interior will still maintain transmit control. If the three hundred milliseconds has expired, then the exterior microphone can be turned on and the exterior speaker turned off. At this point, the sixty four millisecond delay periods will start with the subsequent two millisecond line settling period and the subsequent two millisecond monitoring period.

If a person on the exterior microphone 16 is talking, the four millisecond delay will not materially interfere with the transmission of the speech. This four milisecond delay, even with a monitor every sixty four milliseconds causes no noticeable interference and is not detectable by either of the parties. Due to the persistence of speech phenomenon, to the extent that any sound is missed, the parties will automatically fill in any missing portion of any sound.

It has been found in connection with the present invention that the sixty four millisecond period is sufficient as a delay period before each monitor of the phone line. A monitor, as for example, every 30 milliseconds would obtain a quicker response, but there is a risk that some portion of speech may be lost in the process. Applicant has found that a delay period of 40 milliseconds to 128 milliseconds is effective in the system of the present invention. The two millisecond monitor period is sufficiently small so that no material speech has been lost. However, and here again, Applicant has found that the monitor period can be no less than one millisecond and no more than six milliseconds at a maximum.

A conventional telephone programmer 46 can be connected to the microprocessor 26 for conveniently changing the telephone number of the interior telephone. In this way, the system can be adapted for use at a central location and merely connected through the telephone lines to the hands-off telephone system comprising the microphone 16 and speaker 18 and the interior phone assembly 10. The phone programmer 46 will enable the system to respond to that telephone number which is introduced.

FIG. 2 illustrates a more detailed embodiment of the circuit A of FIG. 1 and shows many of the components which would form part of an operable system in accordance with the present invention.

The microphone 16 is connected directly to a microphone amplifier 50 for amplification of the signal from the microphone 16 and which amplifier is connected directly to the enable switch 22. An adjustable gain control 52 is comprised of a variable resistor 54 and a capacitor 56 connected in a parallel arrangement and which are connected across the amplifier 50 in order to adjust the overall gain thereof. Another amplifier 58 is connected to the output of the microphone enable switch and serves as an input to a buffer amplifier 60.

The amplifier 58 is designed to receive a high-low signal from a touch tone dialing phone and is designed to introduce these phone signals onto the phone line. The buffer amplifier introduces any voice signal from the microphone 16 through a resistive capacitive circuit 62 and which is connected directly to the telephone lines 12.

A full wave rectifier 64 comprised of a plurality of four diodes, connected as shown, functions as a polarity bridge so that the system can be connected with the phone lines in either polarity.

The standard telephone system would include a relay operable circuit 66 comprising a transistor 68 and diode 70 connected as shown along with a conventional dial signal circuitry 72.

The speaker enable signal is transmitted over the speaker enable line 30 to an NPN transistor 74. In addition, the speaker enable signal from the speaker enable switch 28 is transmitted through a variable resistor 76 and an amplifier 78. The variable resistor 76 is designed to provide volume control for the external speaker 18.

A rotary phone signal circuit 80 is provided and comprises an amplifier 82, along with a pair of resistors 84, and which converter circuit is designed to convert an analog level to a digital level.

Finally, the microprocessor generates the microphone enable signal through an NPN transistor 86 and where the collector thereof receives power from a 12-volt source as shown.

FIG. 3 illustrates an algorithm which may be used for the purposes of properly programming the microprocessor. This FIG. 3 also functions as a flow chart to identify those method steps which take place in connection with the method of the present invention.

When the system is initiated, as shown by reference numeral 100, it will ring the interior telephone, step 102 in accordance with that telephone number which has been introduced by the phone programmer 46 into the microprocessor 26. The microprocessor 26 will monitor for a sound on the telephone line. If there is no sound, the microprocessor will turn on the microphone enable switch 22 and turn on the microphone 16 at step 104. The microprocessor will not generate a speaker enable signal and therefore the speaker 18 will be turned off.

There will be a pause for sixty four milliseconds as shown in step 106 at which point the exterior microphone 16 will be turned off, step 108, and another monitor of the phone line will be made, step 110. At this point, a decision is made at step 112. If there is a noise on the phone line, such as a voice noise, the signal representing that noise was derived from the interior phone assembly 10. The microprocessor 26 will thereupon leave the exterior microphone 16 off and the speaker 18 on as shown in step 114.

If there is no noise, such as a voice noise, detected on the phone line, a one minute time out decision 116 is made. The one minute time period continuously runs no matter whether a party is talking on the exterior phone or a party is talking on the interior phone. This time period unconditionally limits phone calls to a one minute time period in length. Obviously, this time period as well as other time periods could be revised as may be necessary for any particular system. Furthermore, if a one minute time period has elapsed and no voice is heard, the system can be automatically turned off and reinitiated at step 100.

Returning to the situation where there is a phone noise at decision point 112, the microphone 16 remained off. Thereafter, there is another monitor of the phone line as shown at step 118. If a party on the interior microphone is transmitting, after a monitor of the phone line and a voice is determined to be present, a three hundred millisecond increment timer is also energized, as shown in step 119. A decision is then made at 120 and if a phone noise does exist, the three hundred millisecond timer will be reset, as shown in step 121, so as to start the seven hundred millisecond period over again. If there is no phone noise present, as determined at step 120, then the three hundred millisecond timer is checked to see if the three hundred millisecond time period has passed, as shown in step 123. If the three hundred millisecond period has been completed, then the exterior microphone will be turned on again and the speaker will be turned off. If the three hundred millisecond time period has not been completed, the exterior microphone will remain off and the speaker will reamin on.

If a decision has been made at step 120 that there is still a noise on the phone line, the three hundred millisecond timer is reset as aforesaid, to start a new count from 0 to three hundred milliseconds, and a decision 122 will be made to determine if it is a tone detect. If it is not a tone detect, and there is no one minute time-out, as shown in step 124, the exterior microphone will remain off and the speaker will remain on. If there is a detection of a one minute time out, that is, where there is no voice heard, the system is disenabled and can be reinitiated at step 100. If a tone detect is made by the microprocessor 26, a positive action signal is generated, as for example, the opening of a gate.

Tone sensing is only accomplished during the time that the exterior speaker is on and the exterior microphone is off. This eliminates the possibility of a party at the exterior mircrophone from utilizing a tone generator and holding the same close to the exterior microphone for purposes of opening the gate or accomplishing some other unauthorized action.

The three hundred millisecond timer effectively allows for pauses between words when someone is talking on the interior phone. Accordingly, there is no need for switchng back and forth during this time period. The three hundred millisecond time period has been determined to be sufficient so as to assure that the person on the interior phone is really finished talking such that microphone control can then be dedicated to the exterior phone.

Thus, there has been illustrated and described a unique and novel voice communication system which uses a hands-off speakermicrophone combination and in which a microprocessor is used to monitor a telephone link to determine if there is an existence of sound and control the line in response thereto. Thus, the present invention fulfills all of the objects and advantages sought therefore. It should be understood that many changes, modifications, variations, and other uses and applications will become apparent to those skilled in the art after considering this specification and the accompanying drawings. Therefore, any and all such changes, modifications, variations, and other uses which do not depart from the spirit and scope of the invention are deemed to be covered by the invention which is limited only by the following claims.

Having thus described our invention, what we desire to claim and secure by letters patent is:

1. A voice communication system comprising:
   (a) a first speaker and a first microphone at a first location which is generally a relatively quiet location,
   (b) a second speaker and a second microphone at a second location which may have relatively substantial background noise,
   (c) a telephone line between the first speaker and first microphone and second speaker and second microphone,
   (d) monitor means for monitoring the telephone line to determine if audible sounds are being generated at the first microphone or at the second microphone while temporarily disabling one of said microphones, and
   (e) control means responsive to said monitor means for automatically transferring transmit control to the first microphone and disabling said second microphone such that transmission cannot occur through said second microphone when audible sounds are generated at said first microphone and for enabling said second microphone to transmit only when audible sounds are not generated at said first microphone.

2. The voice communication system of claim 1 further characterized in that said control means comprises a speaker enable circuit which permits the speaker at the second location to be enabled during the period of time audible sounds are generated at the first location.

3. The voice communication system of claim 2 further characterized in that said control means comprises a microphone enable switch associated with the second location, said switch being automatically turned off to dedicate microphone control to the microphone at the first location when a sound to be transmitted is generated at the first location and turned on when no sound to be transmitted is at the first location.

4. The voice communication system of claim 3 further characterized in that a microprocessor forms part of said control means to initiate a monitor of the telephone line at periodic intervals to determine if a transmitted sound is present on the line.

5. The voice communication system of claim 4 further characterized in that a timing circuit is associated with the microprocessor to cause a monitor of the telephone line at predetermined monitor time intervals.

6. The voice communication system of claim 4 further characterized in that said system comprises a tone splitter to split a tone signal generated at one of said locations, said tone splitter being connected to said microprocessor to enable the latter to initiate a signal which controls a movable member when a tone is present on the line.

7. The voice communication system of claim 4 further characterized in that a phone number programmer is connected to said microprocessor to change the telephone accessing number of a telephone at the first location which comprises the first microphone and first speaker.

8. An improvement in voice communication systems which comprises a first speaker and a first microphone at a first location which is generally a relatively quiet location, a second speaker and a second microphone at a second location which may have relatively substantial background noise, and a telephone line between the first speaker and first microphone and second speaker and second microphone, the improvement comprising:
   (a) means for periodically disabling said second microphone and monitoring said telephone line under conditions where said line can be monitored to determine whether audible sound is present on said line, and
(b) switch means operatively connected to said means for monitoring to disable the microphone at the second location and enable the speaker at the second location whenever audible sound to be transmitted is generated at the first location.

9. The improvement in the voice communication system of claim 8 further characterized in that said switch means comprises a switch controlling the microphone and the speaker at the second location and which switch means automatically enables said speaker at the second location whenever audible sound to be transmitted is generated at the first location, and a microphone enable circuit which disables the microphone at the second location whenever audible sound to be transmitted is generated at the first location.

10. The improvement in the voice communication system of claim 9 further characterized in that a microprocessor is provided to initiate a monitor of the telephone line at periodic intervals to deterine if a transmitted sound is present on the line.

11. The improvement in the voice communication system of claim 10 further charcterized in that a timing circuit is associated with the microprocessor to cause a monitor of the telephone line at predetermined monitor time intervals.

12. The improvement in the voice communication system of claim 10 further characterized in that a phone number programmer is connected to said microprocessor to change the telephone accessing number of a telephone at the first location which comprises the first microphone and first speaker.

13. A method of controlling voice communication in a voice communication system where a first speaker and a first microphone are located at a first location which is generally a relatively quiet location and a second speaker and a second microphone are located at a second location which may have relatively substantial background noise, and which voice communication system comprises a telephone link between the first speaker and first microphone and second speaker and second microphone, said method comprising:
(a) periodically monitoring said telephone link to determine whether audible sound is present on and being carried over said link,
(b) automatically temporarily disabling the microphone at the second location so that no communication can originate from the second location and enabling the speaker at the second location to thereby dedicate transmit control to the microphone at the first location whenever sound to be transmitted is generated at the first location,
(c) enabling the microphone at the second location when no audible sound to be transmitted is generated at the first location, and
(d) automatically returning microphone control to the microphone at the first location when audible sound to be transmitted is again generated at the first location.

14. The method of controlling voice communication of claim 13 further characterized in that said method comprises monitoring the telephone link at regular periodic intervals to determine if a transmitted sound is present on the link.

15. A method of controlling voice communiction in a voice communication system where a first speaker and a first microphone are located at a first location which is generally a relatively quiet location and a second speaker and a second microphone are located at a second location which may have relatively substantial background noise, and which voice communication system comprises a telephone link between the first speaker and first microphone and second speaker and second microphone, said method comprising:
(a) initiating a time delay period of no less than forty milliseconds and no more than one hundred and twenty eight milliseconds during which no telephone link monitoring can take place,
(b) allowing a quiesent phone line settling period to take place after the end of each time delay period to enable an accurate telephone link monitoring,
(c) monitoring the telephone link after said phone link settling period and for a period of time of not less than one millisecond and not more than six milliseconds to determine if sound is present on the telephone link, and
(d) automatically transferring control for transmitting messages over the telephone link to one microphone based on the presence of sound on the telephone line.

16. The method of controlling voice communication of claim 15 further characterized in that said method comprises allowing a phone link settling period of two milliseconds.

17. The method of controlling voice communication of claim 15 further characterized in that said method comprises allowing a time delay period of sixty four milliseconds and monitoring the phone link for two milliseconds.

18. The method of controlling voice communication of claim 15 further characterized in that said method comprises enabling voice transmission from the microphone at the second location when no voice is detected on the telephone link during a monitor period.

19. A voice communication system comprising:
(a) a first speaker and a first microphone at a first location which is generally a relatively quiet location,
(b) a second speaker and a second microphone at a second location which may have relatively substantial background noise,
(c) a telephone line between the first speaker and first microphone and second speaker and second microphone,
(d) a microphone enable switch for temporarily disabling the second microphone,
(e) monitor means for determining if audible sounds are being generated from the first microphone and carried over the telephone line,
(f) control means responsive to said monitor means said control means causing said microphone enable switch to automatically transfer transmit control to the first microphone and disable said second microphone such that transmission cannot occur through said second microphone when audible sounds are generated at said first microphone, said control means also enabling said second microphone to transmit only when audible sounds are not generated at said first microphone, and
(g) a speaker enable circuit forming part of said control means which permits the speaker at the second location to be enabled during the period of time audible sounds are generated at the first location.

20. The voice communication system of claim 19 further characterized in that a microprocessor forms part of said monitor means to initiate a monitor of the telephone line at periodic intervals to determine if a transmitted sound is present on the line.

21. The voice communication system of claim 19 further characterized in that a tone splitter is provided to split a tone signal generated at one of said locations, said tone splitter being connected to said microprocessor to enable the latter to initiate a signal which controls a movable member when a tone is present on the line.

22. A voice communication system comprising:
 (a) a first speaker and a first microphone at a first location which is generally a relatively quiet location,
 (b) a second speaker and a second microphone at a second location which may have relatively substantial background noise,
 (c) a telephone line between the first speaker and first microphone and second speaker and second microphone,
 (d) convesion means converting a voice signal on said telephone line to a DC level signal,
 (e) a monitor means operatively connected to said conversion means for periodically monitoring the telephone line on a preselected time basis to determine the presence of a voice signal on said telephone line, said monitor means comprising a microprocessor,
 (f) timing means operatively associated with said microprocessor to initiate each telephne line monitor on a regular time basis and for a specified time period, and
 (g) control means operatively connected to said monitor means for automatically transferring transmit control to the first microphone and disabling said second microphone when audible sounds are generated at said first microphone as detected during any telephone line monitor and for enabling said second microphone to transmit when audible sounds are not generated at said first microphone.

23. The voice communication system of claim 22 further characterized in that said control means comprises a speaker enable circuit which permits the speaker at the second location to be enabled during the period of time audible sounds are generated at the first location.

24. The voice communication system of claim 23 further characterized in that said control means comprises a microphone enable switch associated with the second location, said switch being automatically turned off to dedicate microphone control to the microphone at the first location when a sound to be transmitted is generated at the first location and turned on when no sound to be transmitted is at the first location.

25. The voice communication system of claim 22 further characterized in that said system comprises a tone splitter to split a tone signal generated at one of said locations, said tone splitter being connected to said microprocessor to enable the latter to initiate a signal which controls a movable member when a tone is present on the line.

26. A method of controlling voice communication in a voice communication system where a first speaker and a first microphone are located at a first location which is generally a relatively quiet location and a second speaker and a second microphone are located at a second location which may have relatively substantial background noise, and which voice communication system comprises a telephone line between the first speaker and first microphone and second speaker and second microphone, said method comprising:
 (a) initiating a time delay period of no less than forty milliseconds and no more than one hundred and twenty eight milliseconds,
 (b) allowing a quiesent phone line settling period to take place after the end of each time delay period,
 (c) monitoring the telephone line for a period of not less than one millisecond and not more than six milliseconds to determine if sound is present on the telephone line,
 (d) automatically disabling the microphone at the second location and enabling the speaker at the second location to thereby dedicate transmit control to the microphone at the first location whenever sound to be transmitted is generated at the first location,
 (e) enabling the microphone at the second location when no audible sound to be transmitted is generated at the first location, and
 (f) automatically returning microphone control to the microphone at the first location when audible sound to be transmitted is again generated at the first location.

27. The method of controlling voice communication of claim 26 further characterized in that said method comprises providing transmit control to the microphone at the second location when no voice is detected on the telephone line during a monitor period.

* * * * *